Sept. 6, 1960 D. P. DONCASTER ET AL 2,951,705

PHONOGRAPH APPARATUS

Filed Sept. 16, 1955

2 Sheets-Sheet 1

INVENTORS
DANIEL P. DONCASTER
FREDERICK L. BUTTON
BY
Campbell, Brumbaugh, Free & Graves
THEIR ATTORNEYS Sept. 6, 1960 D. P. DONCASTER ET AL 2,951,705

PHONOGRAPH APPARATUS

Filed Sept. 16, 1955

2 Sheets-Sheet 2

INVENTORS
DANIEL P. DONCASTER
FREDERICK L. BUTTON
BY
Campbell, Brumbaugh, Free & Graves
THEIR ATTORNEYS 2,951,705
Patented Sept. 6, 1960

2,951,705

PHONOGRAPH APPARATUS

Daniel P. Doncaster, Long Island City, N.Y., and Frederick L. Button, North Bergen, N.J., assignors to Columbia Broadcasting System, Inc., New York, N.Y., a corporation of New York Filed Sept. 16, 1955, Ser. No. 534,676
5 Claims. (Cl. 274—14)

This invention relates to phonographs and more specifically to new and improved phonograph reproducer apparatus that has minimum power requirements and that can be operated effectively without requiring the full attention of the operator.

While phonograph reproducers have been brought to a high state of development in recent years, up to the present time there has been no phonograph reproducer suitable for operation on a moving vehicle such as an automobile, for example. In such use, it is important that the drain imposed by the reproducer upon the power supply of the vehicle be very low. Further, it should be possible for the operator of the vehicle to operate the reproducer effectively without substantial interference with the safe operation of the vehicle. None of the phonograph reproducers available heretofore could meet these stringent requirements.

It is an object of the invention, accordingly, to provide new and improved phonograph reproducer apparatus that is free from the above-noted deficiencies of the prior art.

Another object of the invention is to provide new and improved phonograph reproducer apparatus that has low power requirements and can be played manually with a minimum of attention by the operator.

In accordance with the invention, pickup means is used which comprises a pickup arm mounted only for pivotal movement in a plane parallel to the record turntable and having pickup cartridge means pivotally mounted thereon for movement substantially normally to the path of movement of the pickup arm. Biasing spring means is provided for normally urging the pickup cartridge means towards the plane of the turntable and manually operable actuator means is provided for moving the cartridge means away from the plane of the record.

Coupled to the cartridge means is an arm adapted to cooperate with stationary means to latch the pickup means securely in an initial rest position. The arm is also adapted to cooperate with a stop member to establish a starting position for the pickup means. By manually operating the actuator means for the cartridge means, the pickup means may be unlatched and moved to the correct starting position with respect to a record to be played with a minimum of attention on the part of the operator.

The invention also contemplates the provision of means adapted to be operated upon movement of the pickup means to its rest position for temporarily disengaging deformable engaged parts of the phonograph drive mechanism when the latter is not in operation so as to avoid undesirable permanent deformation of such parts.

For a better understanding of the invention, reference is made to the following detailed description of a representative embodiment, taken in conjunction with the accompanying drawings in which.

Figure 1:
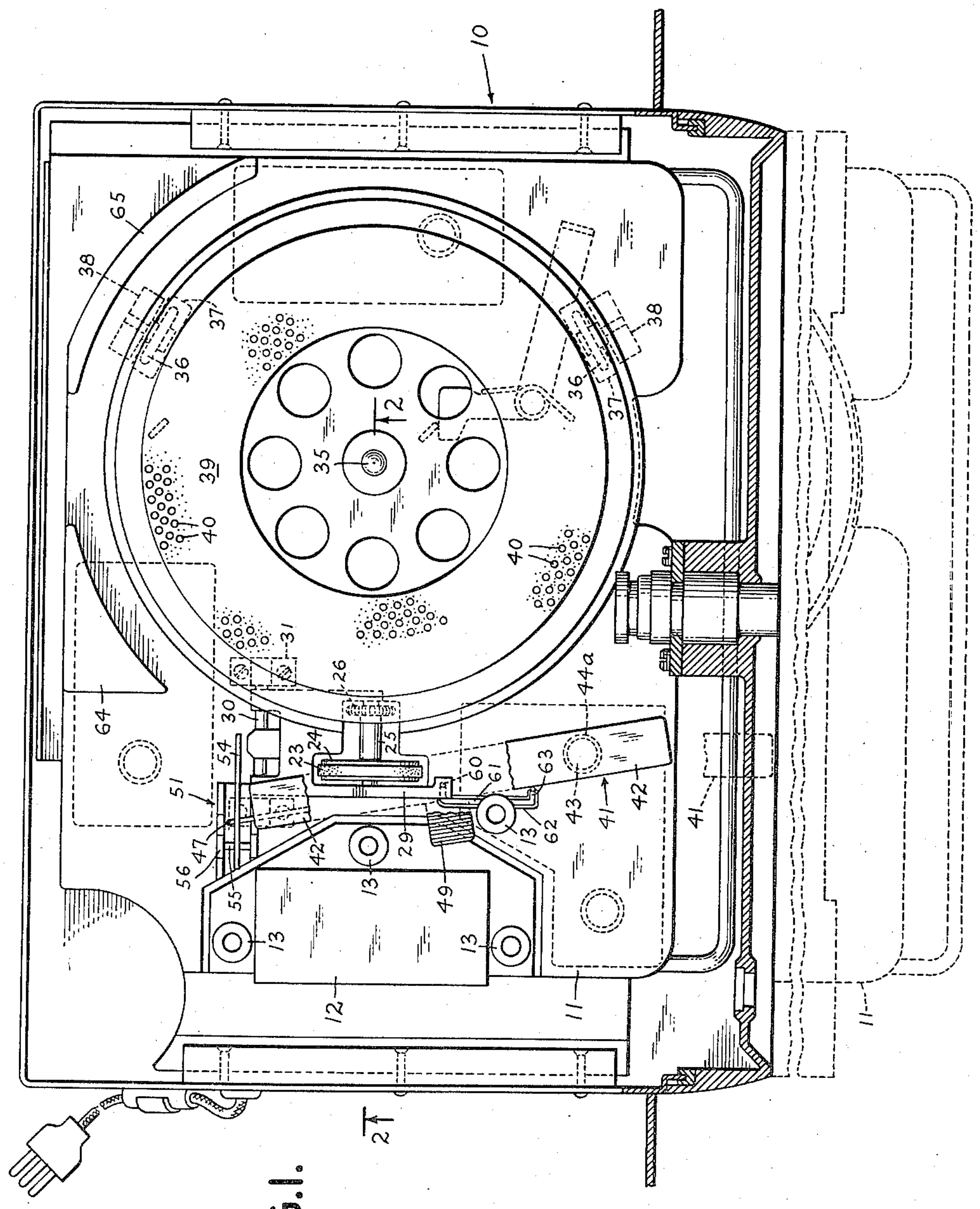
Fig. 1 is a plan view of phonograph reproducer apparatus embodying the invention.

Referring now to Fig. 1, a phonograph reproducer 10 is shown which comprises a plate 11 at one end of which is mounted an electric motor 12. The motor 12 is supported on the plate 10 by a plurality of tubular shock absorbers 13 (Figs. 1 and 2) which serve to minimize the transmission of vibrations from the motor 12 to the phonograph pickup.

Figure 2:
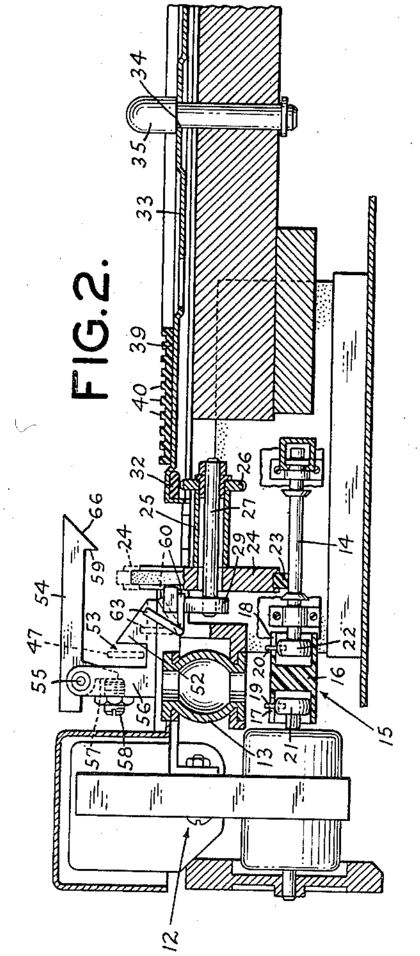
Figure 2 is a fragmentary view taken along the line 2—2 of Fig. 1 and looking in the direction of the arrows.

As best shown in Fig. 2, the motor 12 drives a shaft 14 through a universal coupling 15. The coupling 15 comprises a tubular sleeve 16 made of a suitable material such as nylon having sufficient rigidity to drive the shaft 14 from the motor 12 while minimizing the transfer of vibrations from the motor 12. The sleeve 16 is provided with longitudinal slots 17 and 18 at its opposite ends in which are received a pair of pins 19 and 20, respectively, secured to the rounded edges of disc-like members 21 and 22 mounted on the drive shaft of the motor 12 and on the shaft 14, respectively.

Figure 3:
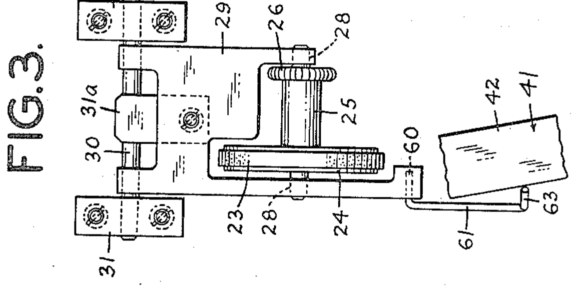
Fig. 3 is a detail of a portion of the drive mechanism in the reproducer of Fig. 1.

The shaft 14 engages the rubber rim 23 of an idler wheel 24 having a hub 25 on which a wheel 26 of smaller diameter and having a knurled rim is also mounted. The idler assembly comprising the idler wheel 24, the hub 25 and the knurled wheel 26 are rotatably mounted on a shaft 27 journaled in bearings 28 (Fig. 3) in a link 29 which is pivotally mounted on a shaft 30 journalled in bearings 31 secured to the underside of the plate 11 (Fig. 1). In order to prevent vibration of the link on the shaft 30, suitable means such as a leaf spring 31*a* secured to the link 29 and continuously pressing against the shaft 30 may be provided for this purpose. The knurled wheel 26 engages the undersurface of an annular ring 32 of rubber or other suitable flexible material which is secured beneath a phonograph turntable 33 adjacent the outer rim thereof.

The turntable 33 is preferably made of thin gauge light metal such as aluminum and it is provided with a center hole 34 which is rotatably mounted on a spindle 35 carried by the plate 11. Support for the turntable 33 is also provided at two other positions, preferably located 120° on either side of the knurled wheel 26, by rollers 36 (Fig. 1) made of rubber or other similar material. The rollers 36 extend through apertures 37 formed in the frame 11 and are journaled in suitable bearings 38 secured to the underside of the plate 11.

In order to minimize slippage between a record to be played and the turntable 33, an annular strip 39 of rubber or other suitable material, formed with small upwardly extending projections 40 on the upper surface thereof, is preferably secured on the top side of the turntable 33.

Figure 4:
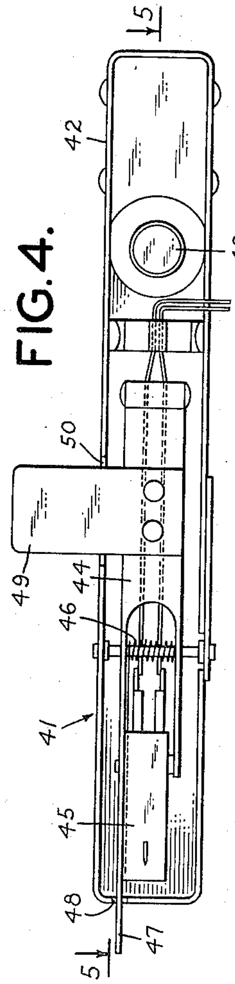
Figs. 4 and 5 are bottom and side views of typical phonograph pickup means suitable for use in the reproducer of Fig. 1.
Figure 5:
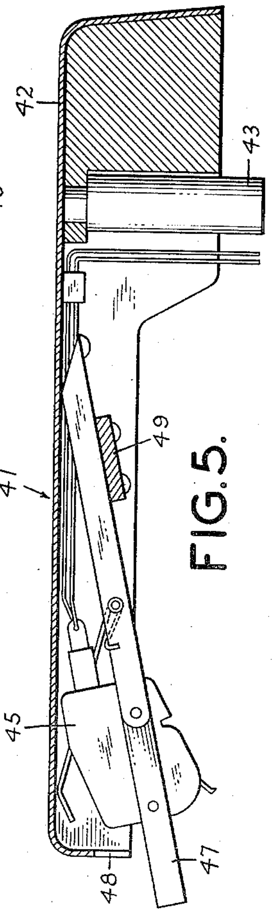

As shown in Figs. 1, 4 and 5, the pickup assembly 41 comprises a housing 42 fixedly secured at its rear end to a shaft 43 which is adapted to be snugly received within a bore 44*a* (Fig. 1) formed in the plate 11 so as to permit turning movement of the pickup assembly 41 only in a horizontal plane. Pivotally mounted in the forward portion of the housing 41 is a channel member 44 having a conventional phonograph cartridge 45 secured at the front end thereof. A compression spring 46 normally urges the cartridge 45 towards the surface of a record to be played. The forward end of the channel member 44 is provided with an extension 47 which lies beyond the front end of the housing 42 and is movable into and out of a slot 48 formed therein. The channel member 44 also has secured thereto a laterally extending actuator 49 which is movable into and out of a slot 50 formed in the housing 42.

When the phonograph is not in use, the pickup assembly 41 is adapted to be located in its initial position by a latching assembly 51 (Figs. 1 and 2) including an upwardly inclined portion 52 along which the extension 47 (Fig. 4) on the channel 44 is adapted to be moved and a slot 53 in which the extension 47 is adapted to be received. The latching assembly 51 is also provided with a laterally extending arm 54 which is pivoted at 55 on an upright member 56 and is maintained substantially horizontal by stop means comprising a downwardly extending portion 57 on the arm 54 which is adapted to cooperate with a set screw 58 for this purpose. The arm 54 has a detent 59 formed at its outer end which is adapted to cooperate with the pickup extension 47 when the latter is raised by depressing the actuator 49 (Figs. 4 and 5) and moved towards the turntable 33 to establish the correct starting position for the pickup when playing a record.

In order to prevent deformation of the flexible rubber rim 23 on the wheel 24 when it rests on the shaft 14, it is desirable to provide means for disengaging the rim 23 from the shaft 14 when the phonograph reproducer is not in use. For this purpose, the free end of the link 29 (Fig. 3) is supported by an arm 60 on a rod 61 mounted in a groove 62 formed in the plate 11 and having an actuator 63 adapted to be actuated by the pickup housing 42 when it is moved to the normal rest position. When the pickup assembly 41 is locked in its initial position with the extension 47 (Fig. 2) in the slot 53, it holds the actuator 63 (Fig. 1) in the proper position to lift the link 29 sufficiently to disengage the rim 23 on the wheel 24 from the shaft 14.

For effective operation on an unstable support such as an automobile, for example, the phonograph reproducer apparatus described above should be provided with means rendering it insensitive to the sudden shocks and accelerations to which it may be subjected when the automobile is in motion. To this end, the phonograph reproducer apparatus may be constructed as described in the copending application Serial No. 533,615, filed September 12, 1955, by Peter Goldmark, for "Phonograph Reproducer." Thus, the plate 11 may be mounted on suitable shock absorbing means such as foam rubber, for example, and the mass of the apparatus may be so distributed with respect to the support afforded by the shock absorbing means as to prevent any accelerations or decelerations of the automobile from tending to cause rotation of the apparatus relatively to its support. Also, the pickup assembly 41 should be counterbalanced against sudden shocks tending to cause it to rotate about its mounting and the cartirdge should also be counterbalanced against sudden shocks tending to cause the latter to turn about its pivot. Suitable viscous damping means such as silicone grease may also be provided between the shaft 43 on which the pickup assembly 41 is mounted and the bore 44*a* (Fig. 1).

In operation, assuming that the pickup assembly 41 is in its initial position with the extension 47 in the slot 53 of the latching mechanism 51, the motor 12 is started by placing a record on the turntable 33 and closing a switch (not shown). In order to facilitate accurate placement of the record without the necessity for watching this operation, the plate 11 is provided with several arcuate guide members 64 and 65 (Fig. 1) which are so positioned relatively to the spindle 35 that if a record is moved into engagement with them and is then allowed to drop it will fall into correct position with the spindle 35 in the center hole. The actuator 49 (Figs. 4 and 5) is then depressed to lift the extension 47 out of the slot 53 (Fig. 2) and the pickup assembly 41 is turned in the direction of the turntable 33 until the extension 47 engages the detent 59. The pickup stylus is now in the correct initial playing position. The actuator 49 is now released to permit the stylus to enter the initial record grooves and the record is played in the usual manner.

After the record has been played, the actuator 49 on the pickup assembly 41 is depressed to lift the cartridge 45 away from the record surface and the pickup assembly 41 is returned to its initial position, the pickup extension 47 being adapted to cooperate with an inclined surface 66 on the arm 54 to lift the latter so that this may be done. When the extension 47 lies directly above the groove 53 in the latching mechanism 51 (Fig. 2) the actuator 49 (Fig. 4) is released allowing the extension 47 to drop into the slot 53 and lock the pickup assembly 41 in the rest position.

In moving to the rest position, as described above, the pickup housing 42 simultaneously engages the actuator 63 on the rod 61 and moves it outwardly so that the arm 60 thereof lifts the free end of the link 29 (Figs. 1, 2 and 3) and disengages the flexible rim 23 from the shaft 14 so as to prevent deformation of the rim 23 while the pickup assembly 41 is in the rest position.

It will be apparent from the foregoing, that the invention provides phonograph reproducer apparatus in which a record can be properly positioned on the turntable and the pickup assembly properly located at the starting position without the necessity for the operator to divert his attention from the operation of the motor vehicle in which the reproducer is mounted. Further, all moving parts are made as light as possible and frictional losses are reduced to an absolute minimum by constructing the drive mechanism as disclosed so that the power requirements for the apparatus are very low.

The specific form of the invention described in detail herein is intended merely to be illustrative and it will be understood that it can be modified in form and detail without departing from the invention. The invention, therefore, is not to be limited to the specific apparatus disclosed but comprehends all modifications coming within the scope of the following claims.

We claim:

1. In phonograph apparatus for use in a moving vehicle including a rotatably mounted turntable, pickup arm means mounted for pivoting movement in a plane parallel to said turntable, and pickup cartridge means pivotally mounted on said pickup arm means for movement towards and away from the plane of said turntable, the combination of a drive shaft, an idler member including a first wheel normally maintained in driven relation to said drive shaft and a second wheel positioned coaxial therewith and in driving relation to said turntable, the axes of rotation of said drive shaft and said idler member first and second wheels being perpendicular to the axis of rotation of said turntable, lever means adapted to be operated in response to movement of said pickup arm for moving said first wheel out of said driven relation to said drive shaft when said pickup arm is moved to an inoperative position, releasable latch means movable with said pickup cartridge means, and stationary recess means adapted to cooperate with said latch means to retain said pickup arm means releasably in position with said idler member out of said driven relation to said drive shaft.

2. In phonograph apparatus for use in a moving vehicle including a rotatably mounted turntable, pickup arm means mounted for pivoting movement in a plane parallel to said turntable, and pickup cartridge means pivotally mounted on said pickup arm means for movement towards and away from the plane of said turntable, the combination of a drive shaft, an idler member including a first wheel normally maintained in driven relation to said drive shaft and a second wheel positioned in driving relation on the underside of said turntable, the axes of rotation of said drive shaft and said idler member first and second wheels being perpendicular to the axis of rotation of said turntable and said second wheel forming a support for said turntable, lever means adapted to be operated in response to movement of said pickup arm for moving said first wheel out of said driven relation to said drive shaft when the pickup is pivoted to an inoperative position, releasable latch means movable with said pickup cartridge means, said latch means being limited in its upward movement by stop means on said pickup arm means, stationary recess means adapted to cooperate with said latch means to retain said pickup arm means releasably in position with said idler member out of said driven relation to said drive shaft, and stop means comprising a pivoted arm having a detent and an inclined surface adapted to be engaged by said latch means when released and moved away from the latched position for establishing a start position of said pickup cartridge means with respect to said turntable, said lever means and said stop means being relatively positioned so that said first wheel is restored to said driven relation to said drive shaft before said detent is engaged.

3. In phonograph apparatus for use in a moving vehicle including a rotatably mounted turntable, pickup arm means mounted for pivoting movement in a plane parallel to said turntable, pickup cartridge means pivotally mounted on said pickup arm means for movement towards and away from the plane of said turntable, spring means normally biasing said cartridge means towards the plane of said turntable, and actuator means for moving said cartridge means away from the plane of said turntable, the combination of a drive shaft, an idler member including a first wheel having a flexible rim portion normally maintained in engagement with said drive shaft and a second wheel integral with said first wheel and in driving relation to said turntable, the axes of rotation of said drive shaft and said idler member first and second wheels being perpendicular to the axis of rotation of said turntable, said second wheel supporting and driving said turntable from the underside of said turntable, means mounting said idler member for movement of said first wheel into and out of engagement with said drive shaft, lever means adapted to be operated in response to movement of said pickup arm means when it is pivoted to an inoperative position for moving said mounting means to move said first wheel out of said driven relation to said shaft, said mounting means being movable about an axis perpendicular to the axis of rotation of said turntable, releasable latch means movable with said pickup cartridge means, stationary recess means adapted to cooperate with said latch means in the normally biased position of said cartridge means to retain said pickup arm means releasably in position with said first wheel out of said driven relation to said shaft, and stop means comprising a pivoted arm having a detent and an inclined surface adapted to cooperate with said latch means when the latter is released and moved away from the latched position for establishing a start position of said pickup cartridge means with respect to said turntable, said lever means and said stop means being relatively positioned so that said first wheel is restored to engagement with said drive shaft before said detent is engaged by said latch means.

4. In phonograph apparatus for use in a moving vehicle including a rotatably mounted turntable and pickup arm means mounted for pivoting movement on a plane parallel to said turntable, the combination of a drive shaft, an idler member including a first wheel having a flexible rim portion normally mounted in engagement with said drive shaft and a second wheel integral with said first wheel and positioned in driving relation to said turntable, the axes of rotation of said drive shaft and said idler member first and second wheels being perpendicular to the axis of rotation of said turntable, a hinged link mounting said idler member for pivotal movement of the said first wheel into and out of engagement with said drive shaft, and lever means cooperating with said hinged link and said pickup arm means to pivot said first wheel away from said drive shaft when said pickup arm means is pivoted to an inoperative position.

5. In phonograph apparatus for use in a moving vehicle including a rotatably mounted light turntable having a friction surface on the underside adjacent the periphery thereof, support means for said turntable including a first wheel and two rollers mounted on the underside of said turntable and angularly spaced about the center thereof, pickup arm means mounted for pivoting movement in a plane parallel to said turntable, driving means for said turntable including a drive shaft, an idler member including said first wheel and a larger second wheel integral and coaxial therewith, said first wheel engaging said friction surface in driving relation to said turntable, and said drive shaft being in driving relation to said second wheel, the axes of rotation of said drive shaft and said first and second wheels being perpendicular to the axis of rotation of said turntable, a hinged link mounting said idler member for pivotal movement about an axis perpendicular to the axis of rotation of said turntable to bring said second wheel into and out of engagement with said drive shaft, and lever means cooperating with said hinged link and said pickup arm to pivot said second wheel away from said drive shaft when said pickup arm is pivoted to an inoperative position.

References Cited in the file of this patent

UNITED STATES PATENTS

| | | |
|---|---|---|
| 1,264,691 | Shoemaker | Apr. 30, 1918 |
| 1,895,126 | Hilpenberg | Jan. 24, 1933 |
| 2,357,034 | Thompson | Aug. 29, 1944 |
| 2,489,146 | Louchheim | Nov. 22, 1949 |
| 2,627,414 | Lear | Feb. 3, 1953 |
| 2,654,457 | Ammlung | Oct. 6, 1953 |
| 2,660,437 | Harman | Nov. 24, 1953 |

FOREIGN PATENTS

| | | |
|---|---|---|
| 133,284 | Sweden | Oct. 16, 1951 |
| 680,810 | Great Britain | Oct. 15, 1952 |
| 724,931 | Great Britain | Feb. 23, 1955 |